United States Patent
Fujiyoshi et al.

(10) Patent No.: US 12,206,770 B2
(45) Date of Patent: Jan. 21, 2025

(54) QUANTUM CRYPTOGRAPHY STORAGE SYSTEM, DISTRIBUTION CONTROL DEVICE, AND COMPUTER PROGRAM PRODUCT

(71) Applicant: KABUSHIKI KAISHA TOSHIBA, Tokyo (JP)

(72) Inventors: Yasuhiro Fujiyoshi, Tokorozawa Saitama (JP); Yoshimichi Tanizawa, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 17/823,190

(22) Filed: Aug. 30, 2022

(65) Prior Publication Data
US 2023/0148242 A1 May 11, 2023

(30) Foreign Application Priority Data
Nov. 11, 2021 (JP) ................. 2021-184355

(51) Int. Cl.
*H04L 9/08* (2006.01)

(52) U.S. Cl.
CPC .......... *H04L 9/0852* (2013.01); *H04L 9/0819* (2013.01); *H04L 9/085* (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS

| 2 A | * | 7/1836 | Goulding | ............... D01G 21/00 |
|---|---|---|---|---|
|   |   |   |   | 57/58.49 |
| 4 A | * | 8/1836 | Blanchard | .................. 74/471 R |

(Continued)

FOREIGN PATENT DOCUMENTS

| JP | 2020-501413 A | 1/2020 |
|---|---|---|
| JP | 2020-020928 A | 2/2020 |

(Continued)

OTHER PUBLICATIONS

ITU-T SG13, \, "Draft Recommendation ITU-T Y.QKDN_frint, Framework for integration of QKDN and secure storage network," SG13-TD601/WP3, 19 pages (2021).
(Continued)

*Primary Examiner* — Sharif E Ullah
(74) *Attorney, Agent, or Firm* — Finnegan, Henderson Farabow, Garrett & Dunner, LLP (57) ABSTRACT

According to an embodiment, a quantum cryptography storage system includes a plurality of storage, a distribution control device, and a distribution device. The plurality of storage devices are connected via a communication network. The distribution control device determines a distribution mode of shares into which data is distributed, based on quantum key distribution network (QKDN) information. The generation device generates an encryption key and a decryption key by using a quantum key shared by using a QKDN. The distribution device distributes the data into the shares, based on the distribution mode. When receiving a share encrypted using the encryption key via the communication network, each of the plurality of storage devices that stores the shares in a distributed manner decrypts the share encrypted with the decryption key and stores a share decrypted.

10 Claims, 10 Drawing Sheets

(58) Field of Classification Search
CPC ....... H04L 9/3226; H04L 9/0891; H04L 9/14; H04L 9/0827; H04L 2209/24; H04L 9/08; H04L 9/0819; H04L 9/088; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86

See application file for complete search history.

(56) References Cited

U.S. PATENT DOCUMENTS

| | | | | |
|---|---|---|---|---|
| 5,764,765 | A * | 6/1998 | Phoenix | H04L 9/0858 380/256 |
| 6,748,083 | B2 * | 6/2004 | Hughes | H04L 9/0858 380/278 |
| 7,437,081 | B2 * | 10/2008 | Mitchell | H04B 10/70 398/154 |
| 8,855,316 | B2 * | 10/2014 | Wiseman | H04L 9/0855 380/278 |
| 9,960,465 | B2 * | 5/2018 | Dudley | H01M 50/204 |
| 10,057,058 | B2 * | 8/2018 | Murakami | H04L 9/0858 |
| 2005/0138352 | A1 * | 6/2005 | Gauvreau | H04L 9/3247 713/153 |
| 2007/0065154 | A1 * | 3/2007 | Luo | H04J 14/0282 398/141 |
| 2007/0076884 | A1 * | 4/2007 | Wellbrock | H04L 9/0855 380/263 |
| 2007/0195774 | A1 * | 8/2007 | Sherman | H04L 69/16 370/392 |
| 2011/0206204 | A1 * | 8/2011 | Sychev | H04J 14/0256 380/256 |
| 2011/0213979 | A1 * | 9/2011 | Wiseman | H04L 9/0844 713/171 |
| 2014/0010234 | A1 * | 1/2014 | Patel | H04L 45/74 370/392 |
| 2014/0068765 | A1 * | 3/2014 | Choi | H04L 63/1416 726/23 |
| 2014/0133652 | A1 * | 5/2014 | Oshida | H04L 9/0897 380/255 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0214525 | A1 * | 7/2017 | Zhao | H04W 12/0431 |
| 2017/0230173 | A1 * | 8/2017 | Choi | H04L 9/0861 |
| 2018/0176091 | A1 * | 6/2018 | Yoon | H04L 43/0888 |
| 2019/0036821 | A1 * | 1/2019 | Levy | G06F 12/0868 |
| 2019/0260581 | A1 | 8/2019 | Su et al. | |
| 2019/0349392 | A1 * | 11/2019 | Wetterwald | H04L 43/0852 |
| 2020/0084222 | A1 * | 3/2020 | William | H04L 63/12 |
| 2021/0194683 | A1 * | 6/2021 | Tanizawa | H04L 9/08 |
| 2022/0147640 | A1 * | 5/2022 | Matsuo | G09C 1/00 |
| 2024/0320369 | A1 | 9/2024 | Fujiwara et al. | |

FOREIGN PATENT DOCUMENTS

| | | |
|---|---|---|
| JP | 2020-134841 A | 8/2020 |
| JP | 2023-14547 A | 1/2023 |

OTHER PUBLICATIONS

M. Fujiwara, et al., "Unbreakable distributed storage with quantum key distribution network and password-authenticated secret sharing," Sci. Reports, 6,28988-1-8, 14 pages, and supplementary information, 6 pages (2016).

International Telecommunication Union, Telecommunication Standardization Sector (ITU-T), "Series Y: Global Information Infrastructure, Internet Protocol Aspects, Next-Generation Networks, Internet of Things and Smart Cities; Quantum key distribution networks: Framework for integration of quantum key distribution network and secure storage network," Recommendation ITU-T Y.3808, 20 pages (2022).

Johannes Braun et al., "LINCOS—A Storage System Provididng Long-Term Integrity, Authenticity, and Confidentiality (Full Paper)," ACM Asia Conference on Computer and Communications Security (ASIACCS 2017), https://eprint.iacr.org/archive/2016/742/20180622:135636, 13 pages (2017).

Japan Patent Office, Decision to Grant a Patent in JP App No. 2021-184355, 2 pages, and machine translation, 2 pages (Nov. 26, 2024).

* cited by examiner

QUANTUM CRYPTOGRAPHY STORAGE SYSTEM, DISTRIBUTION CONTROL DEVICE, AND COMPUTER PROGRAM PRODUCT

CROSS-REFERENCE TO RELATED APPLICATIONS

This application is based upon and claims the benefit of priority from Japanese Patent Application No. 2021-184355, filed on Nov. 11, 2021; the entire contents of which are incorporated herein by reference.

FIELD

Embodiments described herein relate generally to a quantum cryptography storage system, a distribution control device, and a computer program product.

BACKGROUND

A network system (storage network) in which storage devices (storages) such as hard disks are arranged as nodes of a communication network, and writing/reading of data from a user application connected to the communication network to/from these storages is conventionally known. In a case where data stored by an application needs to be kept secret in a storage network, there is a method of improving safety by distributing the data on the basis of a secret sharing algorithm and storing the data in a distributed manner in a plurality of physically separated nodes.

DETAILED DESCRIPTION

According to an embodiment, a quantum cryptography storage system includes a plurality of storage, a distribution control device, a generation device, and a distribution device. The plurality of storage devices are connected via a communication network. The distribution control device determines a distribution mode of shares into which data is distributed, based on quantum key distribution network (QKDN) information. The generation device generates an encryption key and a decryption key by using a quantum key shared by using a QKDN. The distribution device distributes the data into the shares, based on the distribution mode. When receiving a share encrypted using the encryption key via the communication network, each of the plurality of storage devices that stores the shares in a distributed manner decrypts the share encrypted with the decryption key and stores a share decrypted.

Hereinafter, embodiments of a quantum cryptography storage system, a distribution control device, and a program will be described in detail with reference to the accompanying drawings.

In a case where data is distributed on the basis of a secret sharing algorithm and stored in a distributed manner in a plurality of physically separated nodes, the original data cannot be restored unless a certain number or more or all distribution pieces (shares), which depends on the secret sharing algorithm, are obtained. For example, even if a share stored in one node is stolen due to an intrusion into the node via a network or a physical intrusion, it is ensured that the original data cannot be restored and even partial information of the original data cannot be obtained.

In addition, when shares are stored in a distributed manner in a plurality of physically separated nodes, it is necessary not only to protect the shares stored in the nodes, but also to protect communication on communication paths from eavesdropping in a process of transmitting the shares to shareholders which are nodes as distributed storage destinations.

Therefore, there has also been proposed a method of applying one-time pad (OTP) encryption using a quantum key supplied from a quantum key distribution network (hereinafter referred to as QKDN), which is a network different from a storage network, to communication for share transmission to ensure information-theoretic security. In this method, the storage network is positioned as a user who consumes the quantum key provided by the QKDN. That is, the storage network is positioned as an application of the quantum key network.

Since OTP encryption is an encryption scheme that requires a key having the same length as data to be encrypted (plaintext), when a share is transmitted in the storage network by using OTP encryption, it is necessary to receive an OTP encryption key having the same size as the transmitted share from the QKDN. Typically, a rate at which the QKDN can generate and supply a quantum key (OTP encryption key) is lower than a rate of a communication path in a storage network as a general communication path. Therefore, the maximum transmission rate at the time of transmitting the share depends on the OTP encryption key generation/supply rate between the nodes that perform the transmission. When there is a difference in OTP encryption key sharing rate between node pairs, if shares are generated so that sizes of all shares are the same, share transmission in a slower node pair takes a longer time, and the distributed storage processing as a whole is not completed until share transmission in a slowest node pair is completed.

In the following embodiments, a quantum cryptography storage system, a distribution control device, and a program capable of determining a distribution mode of shares in which share transmission in a node pair having a slow rate does not become a bottleneck in the entire distributed storage processing of shares even when there is a difference in OTP encryption key sharing rate different depending on the node pair will be described.

First Embodiment

Figure 1:
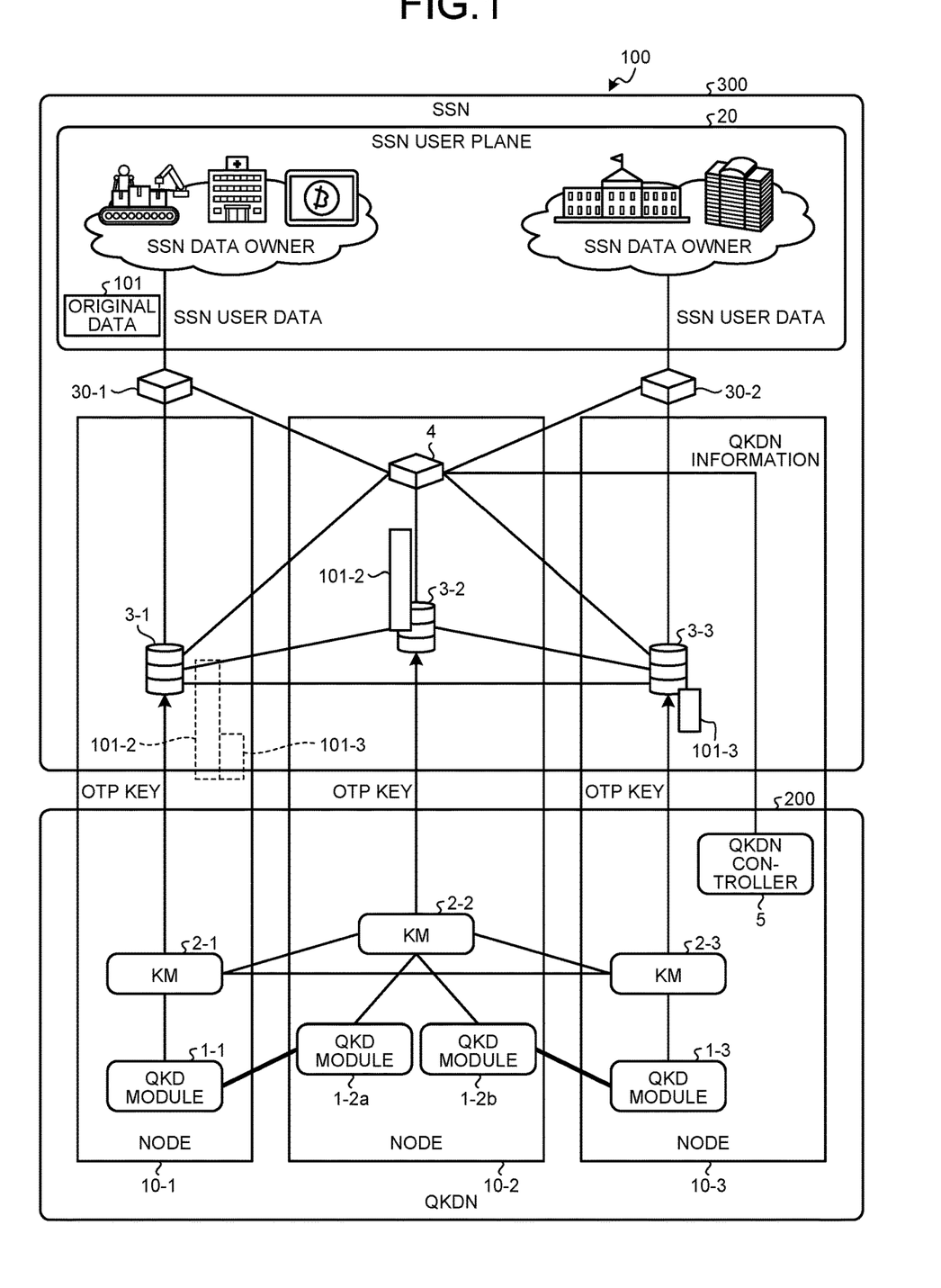
FIG. 1 is a diagram illustrating an example of a device configuration of a quantum cryptography storage system according to a first embodiment.

FIG. 1 is a diagram illustrating an example of a device configuration of a quantum cryptography storage system 100 according to a first embodiment. The quantum cryptography storage system 100 of the first embodiment includes three nodes 10-1 to 10-3, a secure storage network (SSN) user plane 20, and secure storage agents (SSAs) 30-1 to 30-2.

Hereinafter, the nodes 10-1 to 10-3 will be simply referred to as nodes 10 when not distinguished from each other. Each node 10 is installed in each base (for example, a communication office building or the like).

The node 10-1 includes a QKD module 1-1, a key manager (KM) 2-1, and an SSN shareholder 3-1.

The node 10-2 includes a QKD module 1-2a, a QKD module 1-2b, a KM 2-2, an SSN shareholder 3-2, and an SSN controller 4.

The node 10-3 includes a QKD module 1-3, a KM 2-3, an SSN shareholder 3-3, and a QKDN controller 5.

Hereinafter, the QKD modules 1-1 to 1-3 will be simply referred to as QKD modules 1 when not distinguished from each other. Similarly, the KM 2-1 to KM 2-3 will be simply referred to as KMs 2 when not distinguished from each other. Similarly, the SSN shareholders 3-1 to 3-3 will be simply referred to as SSN shareholders 3 when not distinguished from each other. Similarly, the SSAs 30-1 to 30-2 will be simply referred to as SSAs 30 when not distinguished from each other.

Note that the devices installed in each node 10 may be housed in one housing, or may be configured as a plurality of devices by separate housings.

In an SSN user plane 20, an SSN data owner, which is an owner of SSN user data, transmits and receives SSN user data. Upon receiving the SSN user data, the SSAs 30 distribute the SSN user data into a plurality of shares on the basis of a secret sharing algorithm.

Next, a network configuration of the quantum cryptography storage system 100 of the first embodiment will be described. The quantum cryptography storage system 100 of the first embodiment includes two networks of a quantum key distribution network (QKDN) 200 and an SSN 300.

Example of QKDN

The QKDN 200 in the first embodiment is a quantum key distribution network including the three nodes 10-1 to 10-3.

Specifically, the QKDN 200 of the first embodiment includes the QKD modules 1, the KMs 2, and the QKDN controller 5.

The QKD module 1-1 and the QKD module 1-2a generate a bit string (quantum key) shared by both through the QKD link connecting both. The QKD module 1-1 and the QKD module 1-2a transmit quantum keys to the KM 2-1 and the KM 2-2, respectively, whereby the KM 2-1 and the KM 2-2 share a quantum key.

The QKD module 1-2b and the QKD module 1-3 similarly generate a quantum key, and the quantum key is shared between the KM 2-2 and the KM 2-3.

In the present embodiment, the QKD module 1-1 and the QKD module 1-3 are not connected by a QKD link. Therefore, the KM 2-1 and the KM 2-3 share a quantum key by a key relay via KM 2-2, for example, by transmitting a part of the quantum key shared by the KM 2-1 and the KM 2-2 from the KM 2-2 to the KM 2-3.

The shared quantum keys are transmitted from the KMs 2 to the SSN shareholders 3 in response to requests from the SSN shareholders 3 connected to the respective KMs 2.

Example of SSN

The SSN 300 of the first embodiment is a storage network including the three nodes 10-1 to 10-3 (the SSN shareholders 3-1 to 3-3 and the SSN controller 4), the SSN user plane 20, and the SSAs 30.

For example, an SSN data owner accommodated in the SSA 30-1 transmits a storage request to the SSA 30-1 to store SSN user data in the SSN shareholders 3.

Upon receiving the storage request, the SSA 30-1 distributes SSN user data 101 (hereinafter referred to as "original data 101") into a plurality of shares on the basis of a secret sharing algorithm. The SSA 30-1 inquires of the SSN controller 4 about a distribution mode (for example, the number of shares after distribution and the size of each share) for distribution to the shares.

The SSN controller 4 determines a distribution mode and notifies the SSA 30-1 of the distribution mode. In determining the distribution mode, the SSN controller 4 determines a distributed storage mode of the shares to the SSN shareholders 3. FIG. 1 illustrates an example of a case where it is determined that shares 101-2 and 101-3 are stored in a distributed manner in the SSN shareholders 3-2 and 3-3, and at this time, the distribution number in the distribution mode is 2.

In addition, the SSN controller 4 determines the size of each share in the distribution mode between the SSN shareholder 3-1 and the SSN shareholder 3-2 and between the SSN shareholder 3-1 and the SSN shareholder 3-3 according to communication rates available while applying the OTP encryption. In the present embodiment, the communication rates available while applying the OTP encryption are sharing rates of the OTP encryption keys between the KM 2-1 and the KM 2-2 and between the KM 2-1 and the KM 2-3. The SSN controller 4 acquires these sharing rates from the QKDN controller 5.

In the embodiment illustrated in FIG. 1, for example, it is assumed that the OTP encryption key sharing rate between the KM 2-1 and the KM 2-2 is higher than the OTP encryption key sharing rate between the KM 2-1 and the KM 2-3. In this case, the OTP encryption transmission rate between the SSN shareholders 3-1 and 3-2 is higher than the OTP encryption transmission rate between the SSN shareholders 3-1 and 3-3. Therefore, the SSN controller 4 makes the size of the share 3-2 stored in a distributed manner in the SSN shareholder 3-2 larger than the size of the share 101-3 stored in a distributed manner in the SSN shareholder 3-3.

In the example of FIG. 1, the SSA 30-1 distributes the original data 101 into the shares 101-2 and 101-3 on the basis of the distribution mode determined by the SSN controller 4 as described above, that is, the distribution number to shares and the size of each share. Then, the SSA 30-1 temporarily stores the shares 101-2 and 101-3 in the SSN shareholder 3-1 accommodated in the SSA 30-1, and notifies the SSN controller 4 that distribution and temporary storage have been completed.

Upon receiving the notification from the SSA 30-1, the SSN controller 4 instructs the SSN shareholders 3-1 to 3-3 to execute the storage control process. In the storage control process, first, the SSN shareholder 3-1 transmits the share 101-2 to the SSN shareholder 3-2 while performing OTP encryption. Upon receiving the encrypted share 101-2, the SSN shareholder 3-2 decrypts the share 101-2 and stores the decrypted share 101-2. When the share 101-2 is stored in the SSN shareholder 3-2, the SSN shareholder 3-1 deletes the share 101-2 temporarily stored in the SSN shareholder 3-1.

Also for the share 101-3, similarly to the share 101-2, first, the SSN shareholder 3-1 transmits the share 101-3 to the SSN shareholder 3-3 while performing OTP encryption. Upon receiving the encrypted share 101-3, the SSN shareholder 3-3 decrypts the share 101-3 and stores the decrypted share 101-3. When the share 101-3 is stored in the SSN shareholder 3-3, the SSN shareholder 3-1 deletes the share 101-3 temporarily stored in the SSN shareholder 3-1. Note that the process of transmitting the share 101-3 to the SSN shareholder 3-3 while performing OTP encryption starts at the same time as the start of the process of the SSN shareholder 3-1 transmitting the share 101-2 to the SSN shareholder 3-2 while performing OTP encryption.

OTP keys (OTP encryption keys) supplied from the KMs 2 connected to the respective SSN shareholder 3 are used for the OTP-encrypted communication between the SSN shareholders 3. For example, when transmitting the share 101-2 to the SSN shareholder 3-2, the SSN shareholder 3-1 acquires an OTP encryption key from the KM 2-1, and encrypts and transmits the share 101-2 using the OTP encryption key.

The SSN shareholder 3-2 acquires the same OTP encryption key as the OTP encryption key transmitted from the KM 2-1 to the SSN shareholder 3-1 from the KM 2-2, and decrypts the encrypted share 101-2 using the OTP encryption key acquired from the KM 2-2.

Note that the communication paths between the SSN shareholders 3 are, for example, the Internet, but the communication paths may be arbitrary.

According to the present embodiment, it is possible to ensure information-theoretic security against eavesdropping on communication paths for distributed storage in a storage network in which the shares 101-2 and 101-3 into which distribution is made on the basis of a secret sharing algorithm are stored in a distributed manner. In addition, since the time until the transmission of the share 101-2 to the SSN shareholder 3-2 is completed and the time until the transmission of the share 101-3 to the SSN shareholder 3-3 is completed can be brought close to each other, the time until the distributed storage of the shares 101-2 and 101-3 is completed can be brought close to the shortest.

Note that the process in which the SSA 30-1 acquires the distribution mode from the SSN controller 4 does not necessarily need to be performed after the storage request is received by the user, and for example, the distribution mode may be periodically notified from the SSN controller 4 to the SSA 30-1. Similarly, the process in which the SSN controller 4 acquires the sharing rates of the OTP encryption keys from the QKDN controller 5 is not necessarily performed in response to a request from the SSA 30-1, and a method of periodically notifying the SSN controller 4 from the QKDN controller 5 may be adopted.

Furthermore, in the present embodiment, the SSN controller 4 is included in the node 10-2, but for example, the other node 10-1 or node 10-3 may include the SSN controller, or a plurality of nodes may include SSN controllers, and the SSN controllers may perform the storage control execution instruction in cooperation.

In addition, the share 101-2 and the share 101-3 do not necessarily need to be a single share in the secret sharing algorithm to be used, and each may be a set of a plurality of shares. For example, in a case where the size ratio of the shares 101-2 and 101-3 stored in a distributed manner in the shareholders 3-2 and 3-3 is 3:1, the SSN user data may be distributed into 40 shares all having the same size, a set of 30 shares may be allocated to the share 101-2, and a set of the remaining 10 shares may be allocated to the share 101-3. Furthermore, for example, the SSN user data may be distributed into four distribution pieces having different sizes, where two pieces are allocated to the share 101-2 and two pieces are allocated to the share 101-3, and the ratio of the sum of the sizes of the two shares allocated to the share 101-2 and the sum of the sizes of the two shares allocated to the share 101-3 may be 3:1.

The secret sharing algorithm in the present embodiment can use, for example, all-or-nothing transform (AONT), but the secret sharing algorithm is not limited thereto, and may be a predetermined secret sharing algorithm.

Example of Functional Configuration

Figure 2:
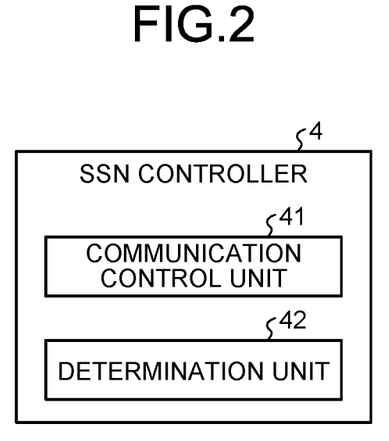
FIG. 2 is a diagram illustrating an example of a functional configuration of an SSN controller according to the first embodiment.

FIG. 2 is a diagram illustrating an example of a functional configuration of the SSN controller 4 of the first embodiment. The SSN controller 4 of the first embodiment includes a communication control unit 41 and a determination unit 42.

The communication control unit 41 receives QKDN information from the QKDN controller 5. For example, the QKDN information includes a sharing rate of the quantum key between each KM 2. Further, for example, the QKDN information includes a stock amount of the quantum key that can be used in each of the plurality of SSN shareholders 3 (storage devices).

In addition, the communication control unit 41 notifies an SSA 30 (distribution device) of a distribution mode of shares into which data is distributed (for example, the distribution number indicating the number of shares into which data is distributed, sizes of the shares, and SSN shareholders 3 that store the shares in a distributed manner).

The determination unit 42 determines a distribution mode of the shares into which the data is distributed on the basis of the QKDN information. For example, the determination unit 42 determines the distribution number, the sizes of the shares, and the SSN shareholders 3 that store the shares in a distributed manner on the basis of at least one of the sharing rate of the quantum key and the stock amount of the quantum key. An example of the determination processing based on the sharing rate of the quantum key will be described later with reference to FIGS. 3A and 4. In addition, an example of determination processing based on both the sharing rate of the quantum key and the stock amount of the quantum key will be described later with reference to FIG. 5.

Figure 3A:
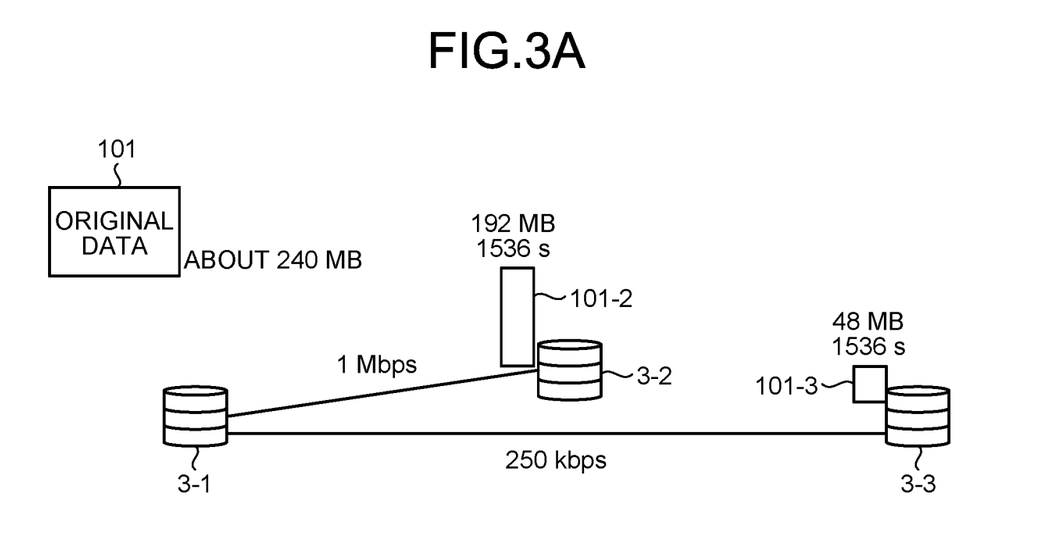
FIG. 3A is a diagram for explaining a share distributed storage method and a required time according to the first embodiment.

FIG. 3A is a diagram for explaining a distributed storage method and a required time for the shares 101-2 and 101-3 according to the first embodiment. FIG. 3A illustrates an example of the sizes of the shares 101-2 and 101-3 specifically determined in the embodiment illustrated above with reference to FIG. 1.

In the example of FIG. 3A, the SSA 30-1 distributes the original data 101 into the two shares 101-2 and 101-3 with a total of 240 MB, which are stored in a distributed manner in the SSN shareholder 3-2 and the SSN shareholder 3-3. Between the SSN shareholder 3-1 and the SSN shareholder 3-2, a quantum key (OTP encryption key) is provided from the QKDN at a rate of 1 Mbps, that is, OTP-encrypted communication at 1 Mbps is available. On the other hand, between the SSN shareholder 3-1 and the SSN shareholder 3-3, a quantum key (OTP encryption key) is provided from the QKDN at a rate of 250 kbps, that is, OTP-encrypted communication at 250 kbps is available.

In this case, the SSN controller 4 acquires the quantum key sharing rate between the KM 2-1 and the KM 2-2 and the quantum key sharing rate between the KM 2-1 and the KM 2-3 from the QKDN controller 5, and recognizes that the OTP-encrypted communication rate between the SSN shareholders 3-1 and 3-2 and the OTP-encrypted communication rate between the SSN shareholders 3-1 and 3-3 are 1 Mbps and 250 kbps, respectively. Then, the SSN controller 4 determines that the size ratio of the shares 101-2 and 101-3 is 4:1, that is, the share 101-2 is 192 MB and the share 101-3 is 48 MB, based on the fact that the ratio of the OTP-encrypted communication rate is 4:1.

With this determination, the time required to transmit the share 101-2 from the SSN shareholder 3-1 to the SSN shareholder 3-2 is 192*8 [Mbit]/1 [Mbps]=1536 seconds. The time required to transmit the share 101-3 from the SSN shareholder 3-1 to the SSN shareholder 3-3 is also 48*8 [Mbit]/0.25 [Mbps]=1536 seconds. As a result, in a case where transmission of the share 101-2 and transmission of the share 101-3 are simultaneously started, transmission of both are completed after 1536 seconds. That is, the SSN controller 4 determines the sizes of the shares 101-2 and 101-3 so that the times required for distributed storage approach the same value, whereby the original data 101 can be stored in a distributed manner in the shareholders 3-2 and 3-3 in a shorter time.

Figure 3B:
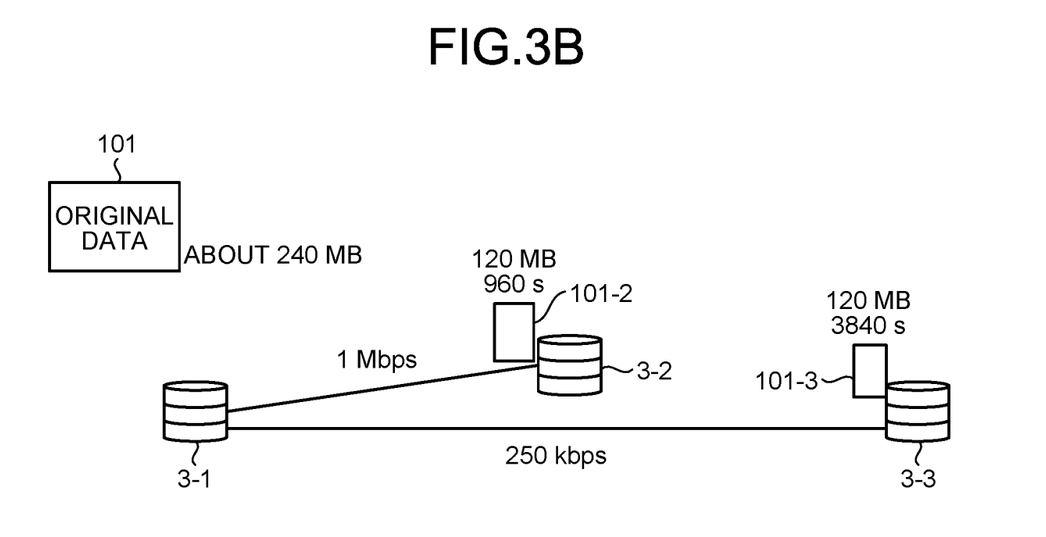
FIG. 3B is a diagram for explaining a time required for share distributed storage.

Note that FIG. 3B is a diagram for explaining the time required for transmission of the share 101-2 and the share 101-3 in a case where the sizes of the share 101-2 and the share 101-3 are equally divided, that is, 120 MB, for example, without using the method according to the present embodiment. In this case, while the time required to transmit the share 101-2 is 120*8 [Mbit]/1 [Mbps]=960 seconds, the time required to transmit the share 101-3 is 120*8 [Mbit]/0.25 [Mbps]=3840 seconds. Therefore, the distributed storage of the shares 101-2 and 101-3 is completed after 3840 seconds.

As illustrated in FIGS. 3A and 3B, according to the present embodiment, it is possible to shorten the time until the distributed storage of the shares 101-2 and 101-3 is completed.

Note that, although FIGS. 1 and 3A illustrate an example in which the original data 101 is distributed into two pieces, the number of SSN shareholders 3 and the distribution number of the original data 101 are not limited thereto, and can take various forms according to the configuration of the SSN, the capacity of the storage means included in the SSN shareholders 3, the management policy, and the like.

Figure 4:
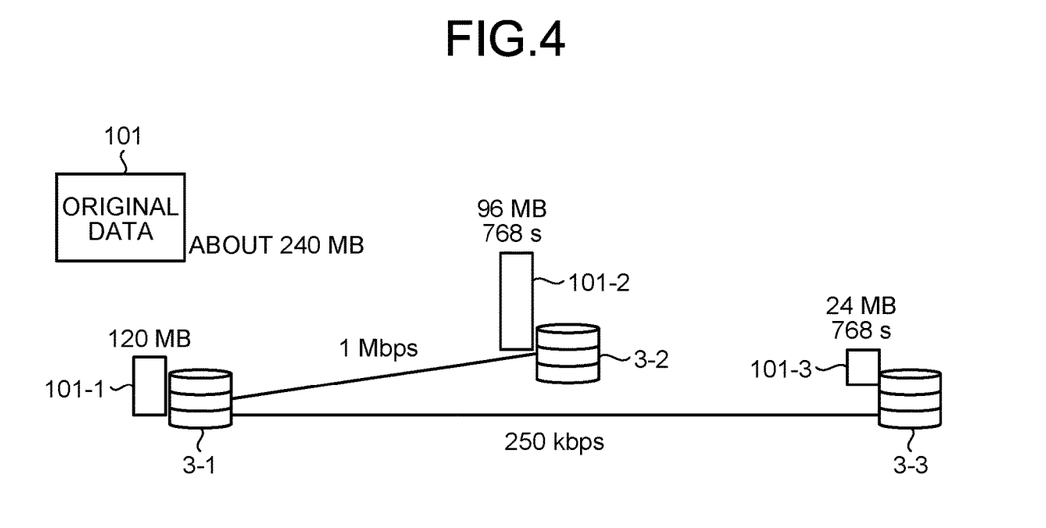
FIG. 4 is a diagram for explaining a share distributed storage method and a required time according to the first embodiment.

FIG. 4 is a diagram for explaining a distributed storage method and a required time for shares 101-1 to 101-3 according to the first embodiment. For example, as illustrated in FIG. 4, the SSA 30-1 may distribute data into three shares 101-1 to 101-3, and the share 101-1 may be stored in a distributed manner in the SSN shareholder 3-1. In this case, assuming that 120 MB is stored in a distributed manner in the share 3-1, the SSN controller 4 determines the sizes of the share 101-2 and the share 101-3 such that 240−120=120 M is distributed to be 4:1, that is, they are 96 MB and 24 MB.

The example illustrated using FIGS. 1 and 3A is a mode in which the QKDN 200 supplies the OTP encryption keys to the SSN shareholder 3 pairs (pair of SSN shareholders 3-1 and 3-2 and pair of SSN shareholders 3-1 and 3-3) while generating the OTP encryption keys. That is, the example illustrated using FIGS. 1 and 3A is a mode in which the sizes of the shares 101-1 and 101-2 are determined on the basis of the supply rates of the OTP encryption keys (the sharing rates of the quantum keys of the KM 2 pairs corresponding to the shareholder 3 pairs), but there is a case where OTP encryption keys accumulated in advance in the QKDN 200 (hereinafter referred to as a "key stock") is available in some pairs of the SSN shareholders 3 or all pairs of the SSN shareholders 3.

Figure 5:
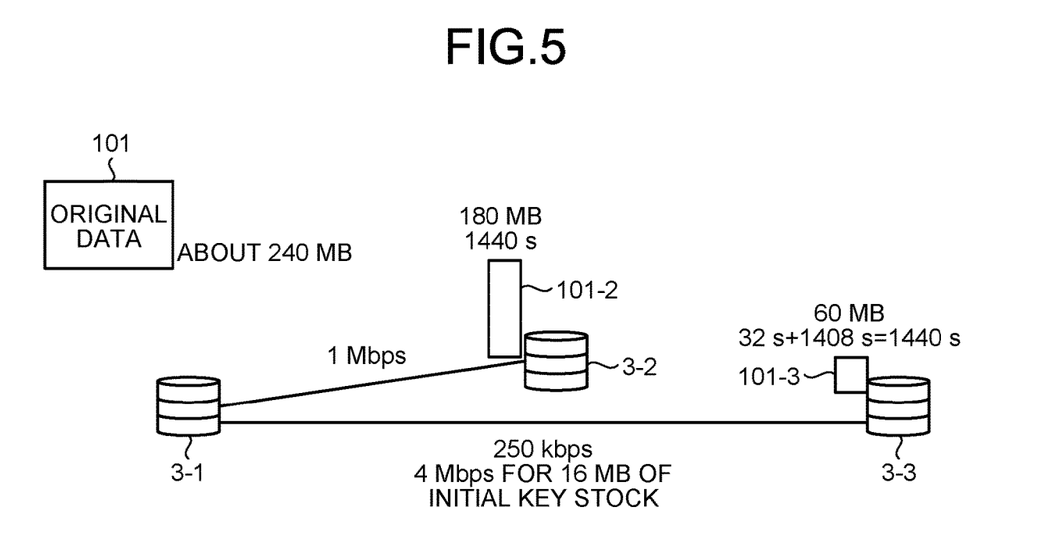
FIG. 5 is a diagram for explaining a share distributed storage method and a required time according to the first embodiment.

FIG. 5 is a diagram for explaining a distributed storage method and a required time for the shares 101-2 and 101-3 according to the first embodiment. The example of FIG. 5 illustrates a case where the key stock is 16 MB, that is, a maximum of 16 MB of the share 101-3 can be transmitted by OTP-encrypted communication using the key stock between the SSN shareholder 3-1 and the SSN shareholder 3-3. The communication rate for this 16 MB is a normal communication rate between the SSN shareholder 3-1 and the SSN shareholder 3-3 regardless of the sharing rate of the OTP encryption key between the KM 2-1 and the KM 2-3 in the QKDN 200. In the example of FIG. 5, the normal communication rate is 4 Mbps, which is the same as the link rate between the SSN shareholder 3-1 and the SSN shareholder 3-3.

At this time, the SSN controller 4 acquires from the QKDN controller 5 that the key sharing rate between the KM 2-1 and the KM 2-3 is 250 kbps and that the key stock of 16 MB is available, recognizes that transmission is possible at 4 Mbps for 16 MB of the share and at 250 kbps for more than 16 MB between the shareholder 3-1 and the SSN shareholder 3-3, and determines the size of the share 101-2 to 180 MB and the size of the share 101-3 to 60 MB, so that the time required for transmission of the share 101-2 and the time required for transmission of the share 101-3 are both 1440 seconds. That is, out of 60 MB, 16 MB is transmitted at 4 Mbps using the key stock, and 44 MB is transmitted at 250 kbps. Therefore, the time required for transmission of the share 101-3 is the sum of 32 seconds (16*8 Mbit/4 Mbps) required for transmission of 16 MB and 1408 seconds ((60−16)*8 Mbit/0.25 Mbps) required for transmission of 44 MB.

Note that if a key stock larger than the size of the share to be transmitted is available, the SSN controller 4 determines the relationship between the time required for transmission and the size of the share on the assumption that the entire share can be transmitted at the rate when the key stock is used, and can determine the size of the share.

Example of Control Method

Figure 6:
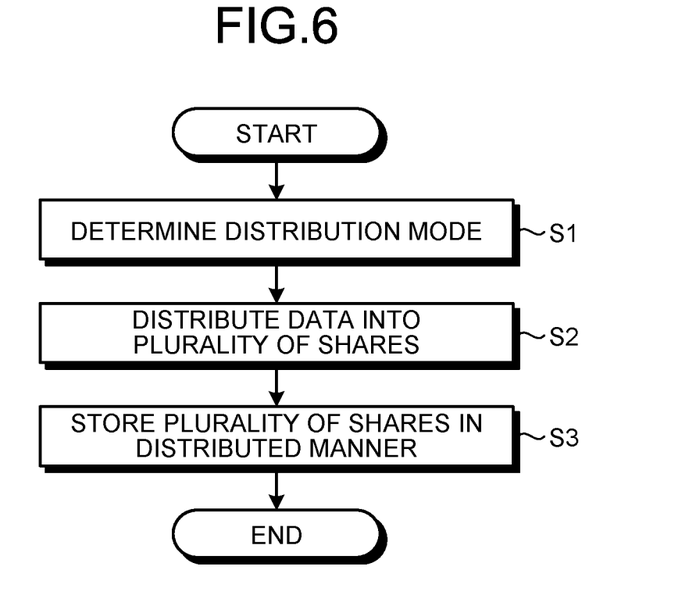
FIG. 6 is a flowchart illustrating an example of a distribution control method according to the first embodiment.

FIG. 6 is a flowchart illustrating an example of a distribution control method according to the first embodiment.

First, the SSN controller 4 (an example of a distribution control device) determines the distribution mode of the share on the basis of the sharing rate of the quantum key and the stock amount (step S1). The distribution mode of the share includes, for example, a distribution number indicating the number of shares into which the data is distributed, sizes of the shares, and SSN shareholders 3 (an example of distributed storage devices) that store the shares in a distributed manner.

Next, an SSA 30 (an example of a distribution device) distributes data into a plurality of shares on the basis of the distribution mode determined by the processing of step S1 (step S2).

Next, among the plurality of SSN shareholders 3 connected by the SSN 300 (an example of a storage network), the SSN shareholder 3 determined in the processing of step S1 stores a plurality of shares in a distributed manner (step S3). Specifically, when receiving the share encrypted with the encryption key via the SSN 300, each SSN shareholder 3 decrypts the encrypted share with the decryption key corresponding to the encryption key, and stores the decrypted share. The encryption key and the decryption key are generated from a quantum key shared using the QKDN 200.

As described above, according to the quantum cryptography storage system of the first embodiment, it is possible to store data in a distributed manner in a plurality of storage devices in a shorter time while ensuring information-theoretic security of communication paths.

Modification of First Embodiment

Next, a modification of the first embodiment will be described. In the description of the modification, the description similar to that of the first embodiment will be omitted, and parts different from those of the first embodiment will be described.

Figure 7:
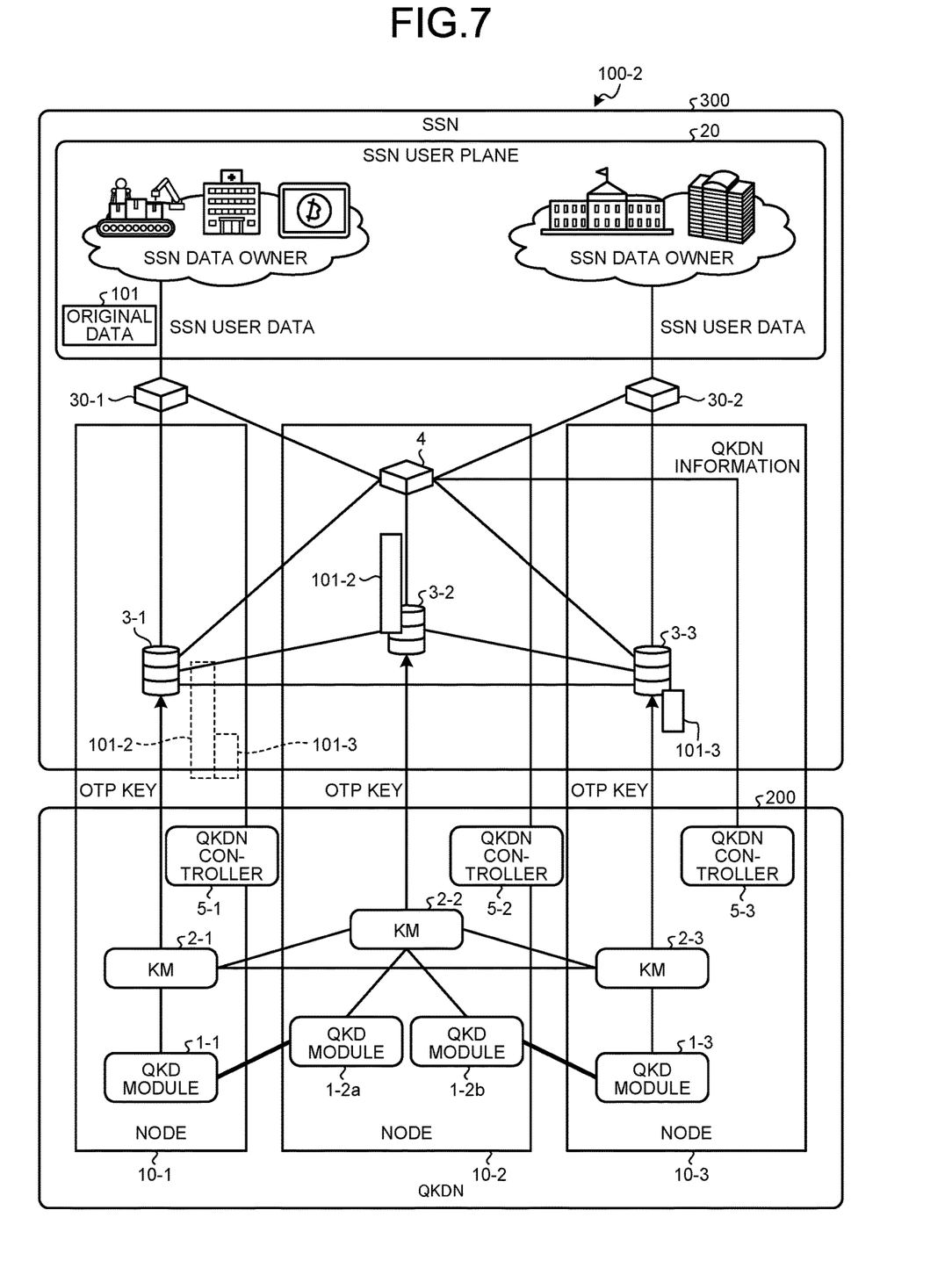
FIG. 7 is a diagram illustrating an example of a device configuration of a quantum cryptography storage system according to a modification of the first embodiment.

FIG. 7 is a diagram illustrating an example of a device configuration of a quantum cryptography storage system 100-2 according to a modification of the first embodiment. The quantum cryptography storage system 100-2 of the modification is different from that of the first embodiment in that QKDN controllers 5-1 to 5-3 are provided in each node 10. The SSN controller 4 may receive the QKDN information from the QKDN controller 5 provided in each node 10.

Second Embodiment

Next, a second embodiment will be described. In the description of the second embodiment, the description similar to that of the first embodiment will be omitted, and parts different from those of the first embodiment will be described. In the second embodiment, a case where a secret sharing algorithm that generates a share having the same size as the original data 101, such as secret sharing by a threshold method using exclusive OR, is used will be described. That is, in the second embodiment, an embodiment will be described on the assumption that the size of the share cannot be varied as in the first embodiment.

Figure 8:
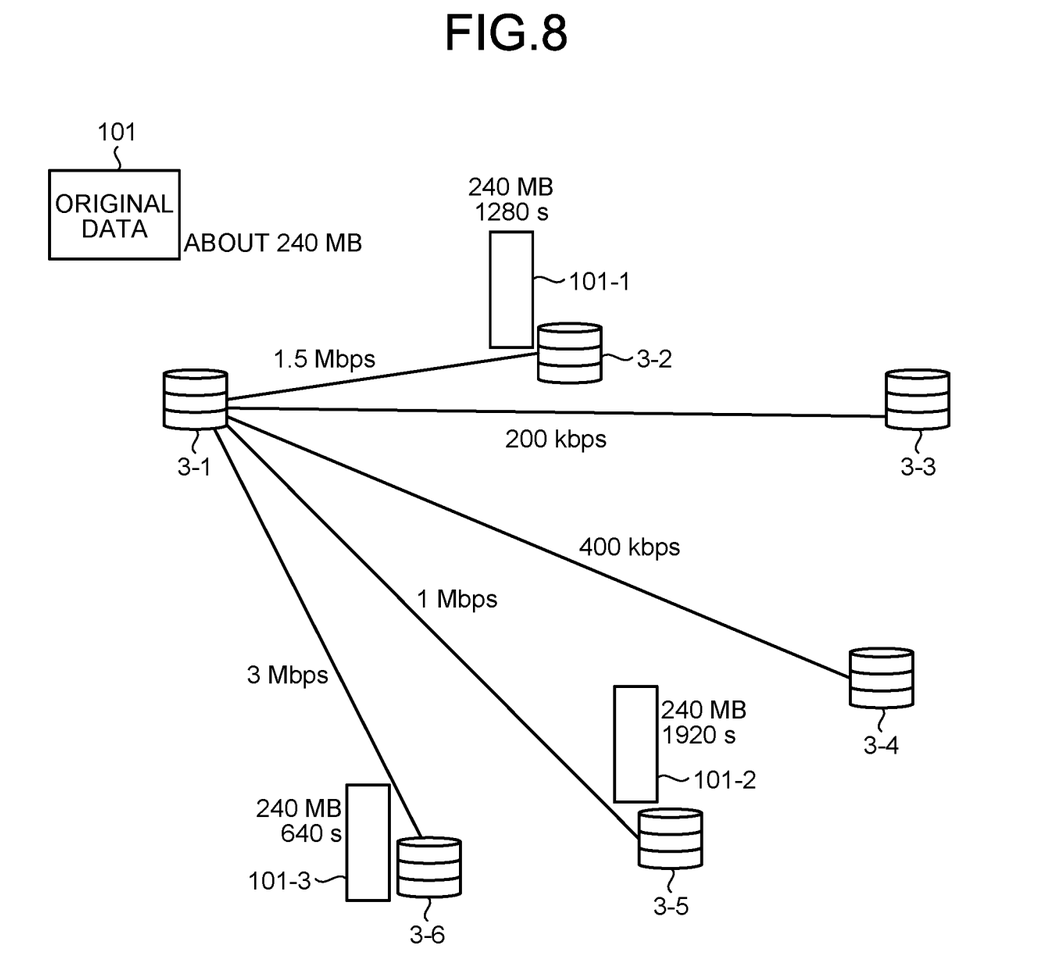
FIG. 8 is a diagram for explaining a share distributed storage method and a required time according to a second embodiment.

FIG. 8 is a diagram for explaining a distributed storage method and a required time for shares 101-1 to 101-3 according to the second embodiment. In the present embodiment, any three of SSN shareholders 3-2 to 3-6 are selected, and the three shares 101-1 to 101-3 temporarily stored in the SSN shareholder 3-1 are stored in a distributed manner. The SSN controller 4 acquires information on the OTP-encrypted communication rates (the sharing rate of the quantum key between the corresponding KMs 2) between the SSN shareholders 3 from the QKDN controller 5, and selects three SSN shareholders 3 that can complete transmission of the shares 101-1 to 101-3 in a shorter time.

In the example of FIG. 8, the OTP-encrypted communication rate between the SSN shareholder 3-1 and the SSN shareholder 3-2 is 1.5 Mbps. The OTP-encrypted communication rate between the SSN shareholder 3-1 and the SSN shareholder 3-3 is 200 kbps. The OTP-encrypted communication rate between the SSN shareholder 3-1 and the SSN shareholder 3-4 is 400 kbps. The OTP-encrypted communication rate between the SSN shareholder 3-1 and the SSN shareholder 3-5 is 1 Mbps. The OTP-encrypted communication rate between the SSN shareholder 3-1 and the SSN shareholder 3-6 is 3 Mbps.

Note that, in the example of FIG. 8, only the links between the SSN shareholder 3-1 and the respective SSN shareholders 3-2 to 3-6 are illustrated for the sake of explanation, but the topology of the storage network including the SSN shareholders 3-1 to 3-6 may be any topology such as a full mesh (fully connected).

When transmitting the shares 101-1 to 101-3 from the SSN shareholder 3-1, the SSN controller 4 selects SSN shareholders 3 capable of completing the transmission of the shares 101-1 to 101-3 in as short a time as possible. That is, the SSN controller 4 selects the three SSN shareholders 3 connected by links having higher OTP-encrypted communication rates. Specifically, in the example of FIG. 8, the SSN controller 4 selects the SSN shareholder 3-2 (link's OTP-encrypted communication rate is 1.5 Mbps), the SSN shareholder 3-5 (link's OTP-encrypted communication rate is 1 Mbps), and the SSN shareholder 3-6 (link's OTP-encrypted communication rate is 3 Mbps).

In the example of FIG. 8, while the QKDN 200 generates the OTP encryption key, the distributed storage destinations of the shares 101-1 to 101-3 are determined on the basis of the supply rates (the sharing rates in the KM 2 pairs corresponding to the shareholder 3 pairs) in a case where the OTP encryption key is supplied to the SSN shareholder 3 pairs. In some or all pairs of SSN shareholders 3, when OTP encryption keys (key stock described above) previously accumulated in the QKDN 200 is available, it may be as illustrated in FIG. 9.

Figure 9:
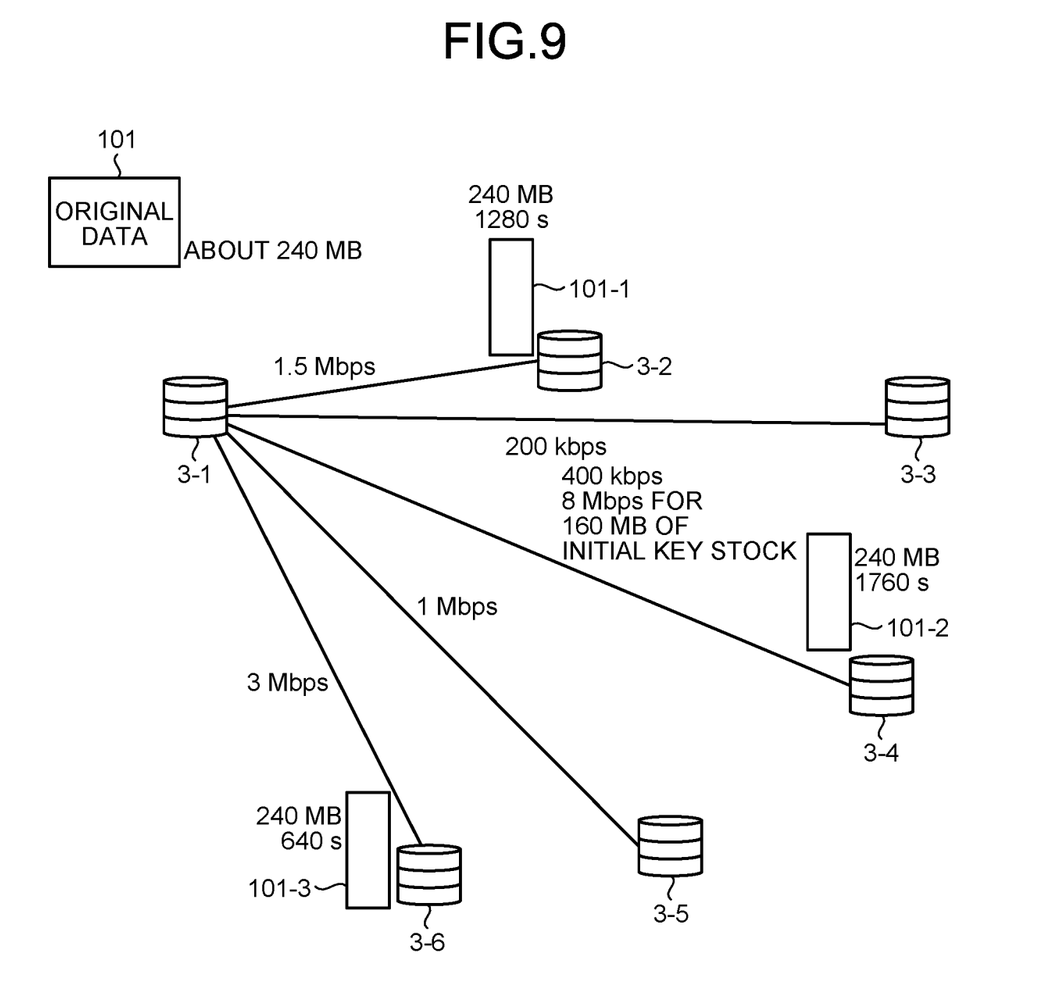
FIG. 9 is a diagram for explaining a share distributed storage method and a required time according to the second embodiment.

FIG. 9 is a diagram for explaining a distributed storage method and a required time for the shares 101-1 to 101-3 according to the second embodiment. The difference from FIG. 8 is that there is 160 MB of key stock between the SSN shareholder 3-1 and the SSN shareholder 3-4. That is, when the SSN shareholder 3-1 transmits the share 101-2 to the SSN shareholder 3-4, up to 160 MB of the share 101-2 can be transmitted by OTP-encrypted communication using the key stock. The communication rate when using the key stock is not bound by the supply rate of the OTP encryption key, and is a normal communication rate (in the example of FIG. 9, 8 Mbps) between the SSN shareholder 3-1 and the SSN shareholder 3-3.

In the example of FIG. 9, when the share 101-2 is transmitted from the SSN shareholder 3-1 to the SSN shareholder 3-4, 160 MB of 240 MB is transmitted at 8 Mbps using the key stock, and 80 MB is transmitted at 400 kbps. Therefore, the time required for transmission of the share 101-2 is a total of 1760 seconds including 160 seconds (160*8 Mbit/8 Mbps) required for transmission of 160 MB and 1600 seconds ((240−160)*8 Mbit/0.4 Mbps) required for transmission of 80 MB.

In the example of FIG. 9, since the time required for transmission to the SSN shareholder 3-4 (1760 seconds) is shorter than the time required for transmission to the SSN shareholder 3-5 in FIG. 8 (1920 seconds), the SSN shareholder 3-4 is selected as the distributed storage destination of the share 101-2.

Third Embodiment

Next, a third embodiment will be described. In the description of the third embodiment, the description similar to that of the first embodiment will be omitted, and parts different from those of the first embodiment will be described. In the first and second embodiments, transmission is directly performed from the SSN shareholder 3-1 serving as the starting point to the SSN shareholders 3 serving as the distributed storage destinations. In the present embodiment, as illustrated in FIGS. 10A and 10B, a case where shares 101-2 to 101-4 are transmitted to the SSN shareholders 3 as the distributed storage destinations via other SSN shareholders 3 will be described.

Figure 10A:
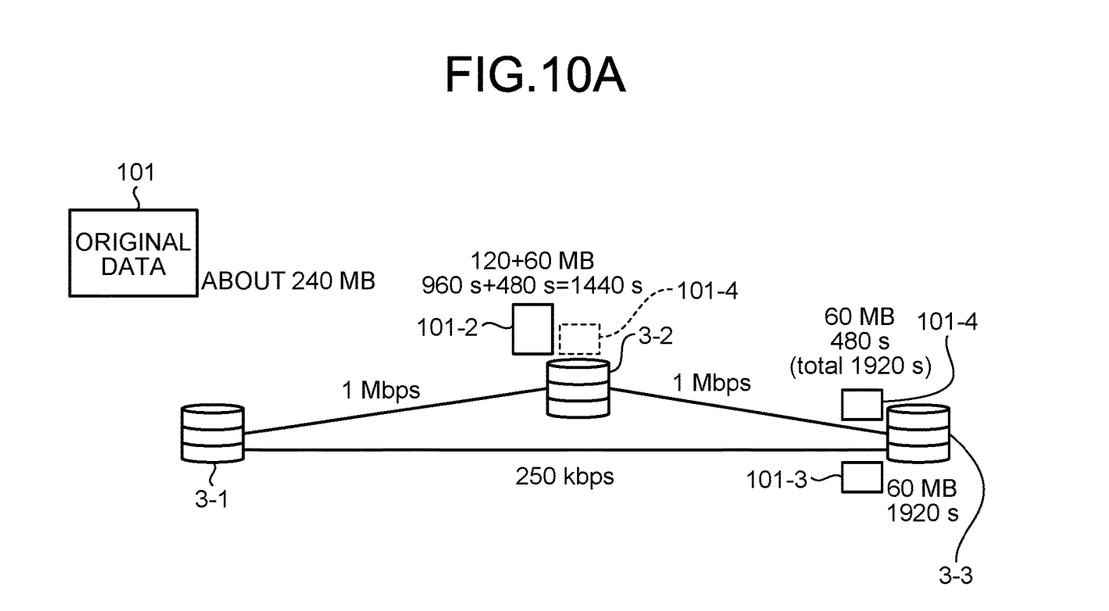
FIG. 10A is a diagram for explaining a share distributed storage method and a required time according to a third embodiment.
Figure 10B:
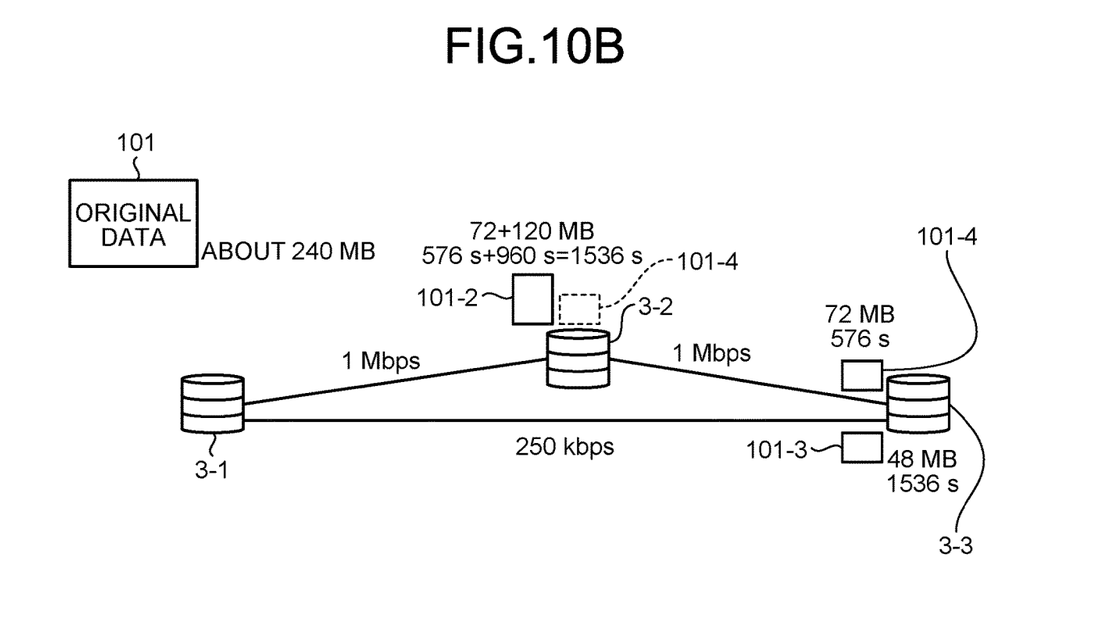
FIG. 10B is a diagram for explaining a share distributed storage method and a required time according to the third embodiment.

FIGS. 10A and 10B are diagrams for explaining a distributed storage method and a required time for the shares 101-2 to 101-4 according to the third embodiment. The examples of FIGS. 10A and 10B illustrate a case where distributed storage is performed such that the storage capacity consumption of the SSN shareholder 3-2 and the storage capacity consumption of the SSN shareholder 3-3 are equal.

In the example illustrated in FIGS. 10A and 10B, the OTP-encrypted communication rate between the SSN shareholder 3-1 and the SSN shareholder 3-2 is 1 Mbps. The OTP-encrypted communication rate between the SSN shareholder 3-2 and the SSN shareholder 3-3 is 1 Mbps. The OTP-encrypted communication rate between the SSN shareholder 3-1 and the SSN shareholder 3-3 is 250 kbps.

In the example of FIGS. 10A and 10B, the SSN controller 4 determines to distribute the original data 101 into the three shares 101-2 to 101-4. Then, the SSN controller 4 performs control to transmit the share 101-3 from the SSN shareholder 3-1 to the SSN shareholder 3-3, and transmit the shares 101-2 and 101-4 from the SSN shareholder 3-1 to the SSN shareholder 3-2. Note that, regardless of the transmission order of the shares 101-2 and 101-4, either may precede, or part of the share 101-2 and part of the share 101-4 may be alternately transmitted.

In addition, when the transmission of the share 101-4 to the SSN shareholder 3-2 is completed, the SSN controller 4 causes the share 101-4 to be transmitted from the SSN shareholder 3-2 to the SSN shareholder 3-3, and after the transmission is completed, causes the share 101-4 to be deleted from the SSN shareholder 3-2.

FIG. 10A is an example in which transmission of the share 101-4 from the SSN shareholder 3-2 to the SSN shareholder 3-3 is started after transmission of both the share 101-2 and the share 101-4 from the SSN shareholder 3-1 to the SSN shareholder 3-2 is completed. If the SSN shareholder 3-2 is able to receive the share 101-2 from the SSN shareholder 3-1 and transmit the share 101-4 to the SSN shareholder 3-3 in parallel, it can be as in FIG. 10B.

In FIG. 10B, distribution is made such that the shares 101-2, 101-3, and 101-4 are 120 MB, 48 MB, and 72 MB, respectively. The SSN controller 4 starts the transmission of the share 101-3 from the SSN shareholder 3-1 to the SSN shareholder 3-3, and at the same time, starts transmission of the share 101-4 from the SSN shareholder 3-1 to the SSN shareholder 3-2. Then, when the transmission of the share 101-4 is completed 576 seconds after the start, the SSN controller 4 immediately starts the transmission of the share 101-4 from the SSN shareholder 3-2 to the SSN shareholder 3-3, and simultaneously starts the transmission of the share 101-2 from the SSN shareholder 3-1 to the SSN shareholder 3-2.

Further, after 576 seconds, the transmission of the share 101-4 to the SSN shareholder 3-3 is completed, and similarly after 960 seconds, the transmission of the share 101-2 to the SSN shareholder 3-2 is completed. Therefore, after 576 seconds+960 seconds=1536 seconds after the transmission of the share 101-4 from the SSN shareholder 3-1 to the SSN shareholder 3-2 is started, the processing of storing the shares 101-2 and 101-4 in a distributed manner in the SSN shareholders 3-2 and 3-4 is completed, and at the same time, the transmission of the share 101-3 to the SSN shareholder 3-3 is completed. As a result, the distributed storage can be completed in a shorter time than in the case of FIG. 10A.

Furthermore, FIGS. 10A and 10B illustrate an example of a case where there is no key stock, but in a case where key stock is available between the SSN shareholders 3, the SSN controller 4 may determine a distribution mode of the shares in consideration of the key stock.

Note that, in the first to third embodiments described above, in order to simplify the description, the time required for controlling the start of the transmission process, the time required for controlling the end of the transmission process, the time required for controlling the start of the reception process, the time required for controlling the end of the reception process, and the time required for controlling the start of the next transmission subsequent to the completion of the transmission have been described as 0, but these times do not need to be 0. In the process of calculating the time required for the transmission of the shares from the OTP-encrypted communication rates and the key stock acquired from the QKDN controller 5, the SSN controller 4 may determine the sizes of the shares in consideration of these times.

In addition, in order to simplify the description, in FIGS. 3A, 3B, 4, and 5, an example in which the size of the original data 101 is the same as the total size of the shares 101-2 to 101-3 into which the distribution is made has been described. In addition, in FIGS. 10A and 10B, an example in which the size of the original data 101 and the total size of the shares 101-2 to 101-4 into which the distribution is made are the same has been described. It is not essential that the total sizes are the same, and for example, as in the AONT, a case where the total of the sizes of the shares 101-2 to 101-N (N is an integer) into which the distribution is made by the secret sharing algorithm is larger than the size of the original data 101 is also assumed. Even in such a case, similarly to the first to third embodiments described above, the time required for transmission of the shares 101-2 to 101-N can be obtained from the sizes of the shares 101-2 to 101-N after distribution, the OTP-encrypted communication rates between the SSN shareholders 3, and the key stock.

Finally, an example of a hardware configuration of the QKD modules 1, the KMs 2, the SSN shareholders 3, the SSN controller 4, and the QKDN controllers 5 of the first to third embodiments will be described.

Example of Hardware Configuration

Figure 11:
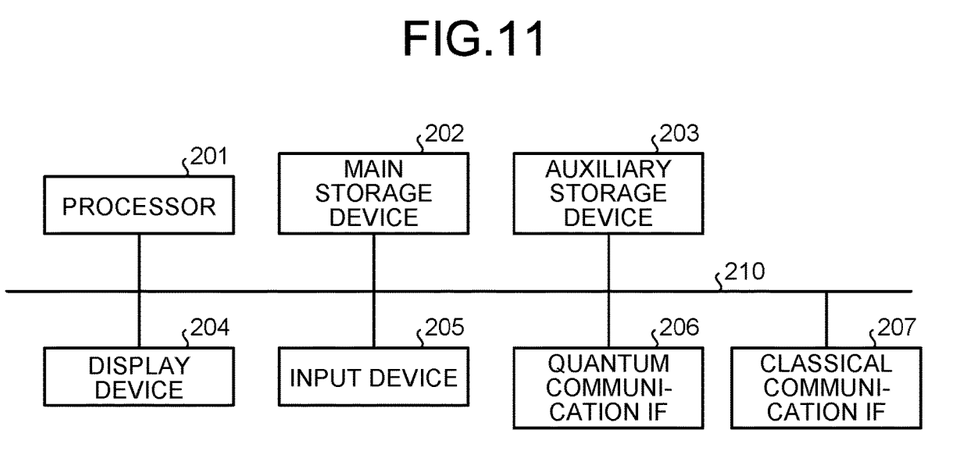
FIG. 11 is a diagram illustrating an example of a hardware configuration of a QKD module according to the first to third embodiments.

FIG. 11 is a diagram illustrating an example of a hardware configuration of a QKD module 1 according to the first to third embodiments. The QKD module 1 includes a processor 201, a main storage device 202, an auxiliary storage device 203, a display device 204, an input device 205, a quantum communication IF (interface) 206, and a classical communication IF 207. The processor 201, the main storage device 202, the auxiliary storage device 203, the display device 204, the input device 205, the quantum communication IF 206, and the classical communication IF 207 are connected via a bus 210.

The processor 201 executes a program read from the auxiliary storage device 203 to the main storage device 202. The main storage device 202 is a memory such as a read only memory (ROM) and a random access memory (RAM). The auxiliary storage device 203 is a hard disk drive (HDD), a memory card, or the like.

The display device 204 displays the state and the like of the QKD module 1. The input device 205 receives an input from the user. Note that the QKD module 1 may not include the display device 204 and the input device 205.

The quantum communication IF 206 is an interface for connection to a quantum cryptography communication path (optical fiber link). The classical communication IF 207 is an interface for connecting to a QKD control signal communication path, the KMs 2, and the like. When the QKD module 1 does not include the display device 204 and the input device 205, for example, the display function and the input function of the external terminal connected via the classical communication IF 207 may be used.

Figure 12:
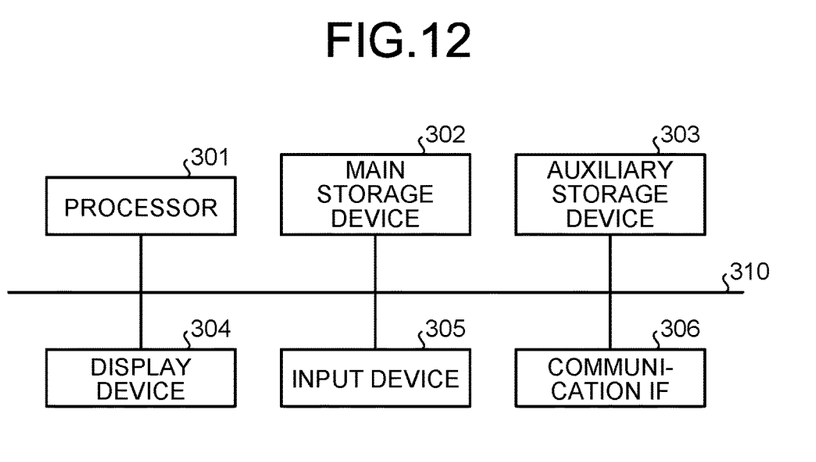
FIG. 12 is a diagram illustrating an example of a hardware configuration of a KM, an SSN shareholder, an SSN controller, a QKDN controller, and an SSA according to the first to third embodiments.

FIG. 12 is a diagram illustrating an example of a hardware configuration of the KMs 2, the SSN shareholders 3, the SSN controller 4, the QKDN controllers 5, and the SSAs 30 according to the first to third embodiments. Since the hardware configurations of the KMs 2, the SSN shareholders 3, the SSN controller 4, the QKDN controllers 5, and the SSAs 30 are similar to each other, the SSN controller 4 will be described as an example in the following description.

The SSN controller 4 includes a processor 301, a main storage device 302, an auxiliary storage device 303, a display device 304, an input device 305, and a communication IF 306. The processor 301, the main storage device 302, the auxiliary storage device 303, the display device 304, the input device 305, and the communication IF 306 are connected via a bus 310.

The processor 301 executes a program read from the auxiliary storage device 303 to the main storage device 302. The main storage device 302 is a memory such as a ROM and a RAM. The auxiliary storage device 303 is an HDD, a memory card, or the like.

The display device 304 displays the state and the like of the SSN controller 4. The input device 305 receives an input from the user. Note that the SSN controller 4 may not include the display device 304 and the input device 305.

The communication IF 306 is an interface for connecting to the SSN shareholders 3, the SSAs 30, and the like. When the SSN controller 4 does not include the display device 304 and the input device 305, for example, a display function and an input function of an external terminal connected via the communication IF 306 may be used.

The programs executed by the QKD modules 1, the KMs 2, the SSN shareholders 3, the SSN controller 4, the QKDN controllers 5, and the SSAs 30 are stored in computer-readable storage media such as a CD-ROM, a memory card, a CD-R, a digital versatile disc (DVD), and a Blu-ray (registered trademark) disc as a file in an installable format or an executable format, and are provided as computer program products.

In addition, the programs executed by the QKD modules 1, the KMs 2, the SSN shareholders 3, the SSN controller 4, the QKDN controllers 5, and the SSAs 30 may be stored on a computer connected to a network such as the Internet and provided by being downloaded via the network.

In addition, the programs executed by the QKD modules 1, the KMs 2, the SSN shareholders 3, the SSN controller 4, the QKDN controllers 5, and the SSAs 30 may be provided via a network such as the Internet without being downloaded.

In addition, the programs executed by the QKD modules 1, the KMs 2, the SSN shareholders 3, the SSN controller 4, the QKDN controllers 5, and the SSAs 30 may be provided by being incorporated in a ROM or the like in advance.

Some or all of the functions of the QKD modules 1, the KMs 2, the SSN shareholders 3, the SSN controller 4, the QKDN controllers 5, and the SSAs 30 may be realized by hardware such as an integrated circuit (IC). The IC is, for example, a processor that is designed to execute an application-specific task.

In addition, in a case where each function is realized by using a plurality of processors, each processor may realize one of the functions or may realize two or more of the functions.

Although some embodiments of the present invention have been described, these embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

For example, the distributed storage method of the third embodiment may be applied to the first or second embodiment.

What is claimed is:

1. A quantum cryptography storage system comprising:
a plurality of storage devices connected via a communication network;
a distribution control device that determines a distribution mode of shares into which data is distributed, based on quantum key distribution network (QKDN) information;
a generation device that generates an encryption key and a decryption key by using a quantum key shared by using a QKDN; and
a distribution device that distributes the data into the shares, based on the distribution mode, wherein
when receiving a share encrypted using the encryption key via the communication network, each of the plurality of storage devices that stores the shares in a distributed manner decrypts the share encrypted with the decryption key and stores a share decrypted,
the QKDN information includes at least one of a sharing rate of the quantum key used as the encryption key between the plurality of storage devices and a stock amount of the quantum key used as the encryption key in each of the plurality of storage devices, and
the distribution mode includes information indicating a distribution number indicating a number of shares into which the data is distributed, sizes of the shares, and distributed storage devices that store the shares in a distributed manner.

2. The system according to claim 1, wherein
the shares are each encrypted by the one-time pad encryption using the encryption key.

3. The system according to claim 2, wherein
the distribution control device determines the distribution number, the sizes of the shares, and the distributed storage devices, based on at least one of the sharing rate of the quantum key used as the encryption key between the plurality of storage devices, and the stock amount of the quantum key used as the encryption key in each of the plurality of storage devices.

4. The system according to claim 3, wherein the distribution control device calculates required times required for distributed storage of the shares for each of the plurality of storage devices from at least one of the sharing rate of the quantum key and the stock amount of the quantum key used in each of the plurality of storage devices, and determines the distribution number, the sizes of the shares, and the distributed storage devices, based on the required times.

5. The system according to claim 4, wherein the distribution control device selects a storage device that temporarily stores the shares from the plurality of storage devices, and determines the sizes of the shares such that required times for storing the shares in a distributed manner in the distributed storage devices from the selected storage device via the communication network approach a same value.

6. The system according to claim 3, wherein the distribution control device calculates required times required for distributed storage of the shares for each of the plurality of storage device from at least one of the sharing rate of the quantum key and the stock amount of the quantum key used in each of the plurality of storage devices, and selects a number of distributed storage devices from the plurality of storage devices in ascending order of the required times.

7. The system according to claim 3, further comprising a QKDN control device that acquires the QKDN information from a key management device, wherein the distribution control device receives the QKDN information from the QKDN control device.

8. The system according to claim 1, wherein the distribution device distributes the data into the plurality of shares, based on the distribution mode and a predetermined secret sharing algorithm.

9. A distribution control device that communicates with a plurality of storage devices and a distribution device connected via a communication network, the distribution control device comprising:
one or more hardware processors configured to:
determine a distribution mode of shares into which data is distributed, based on quantum key distribution network (QKDN) information; and
notify the distribution device of the distribution mode, wherein
the QKDN information includes at least one of a sharing rate of the quantum key used as the encryption key between the plurality of storage devices and a stock amount of the quantum key used as the encryption key in each of the plurality of storage devices, and
the distribution mode includes information indicating a distribution number indicating a number of shares into which the data is distributed, sizes of the shares, and distributed storage devices that store the shares in a distributed manner.

10. A computer program product comprising a non-transitory computer-readable medium including programmed instructions, the instructions causing a computer that communicates with a plurality of storage devices and a distribution device connected via a communication network to:
determine a distribution mode of shares into which data is distributed, based on quantum key distribution network (QKDN) information; and
notify the distribution device of the distribution mode, wherein
the QKDN information includes at least one of a sharing rate of the quantum key used as the encryption key between the plurality of storage devices and a stock amount of the quantum key used as the encryption key in each of the plurality of storage devices, and
the distribution mode includes information indicating a distribution number indicating a number of shares into which the data is distributed, sizes of the shares, and distributed storage devices that store the shares in a distributed manner.

* * * * *